United States Patent
Yang et al.

(10) Patent No.: US 7,426,120 B2
(45) Date of Patent: Sep. 16, 2008

(54) SWITCHING CONTROL CIRCUIT HAVING A VALLEY VOLTAGE DETECTOR TO ACHIEVE SOFT SWITCHING FOR A RESONANT POWER CONVERTER

(75) Inventors: Ta-Yung Yang, Milpitas, CA (US); Rui-Hong Lu, Shueishang Township, Chiayi County (TW); Chuh-Ching Li, Jhongli (TW); Feng-Cheng Tsao, Linbian Township, Pingtung County (TW); Pei-Sheng Tsu, Shulin (TW)

(73) Assignee: System General Corporation, Taipei Hsien (TW)

( * ) Notice: Subject to any disclaimer, the term of this patent is extended or adjusted under 35 U.S.C. 154(b) by 8 days.

(21) Appl. No.: 11/287,268

(22) Filed: Nov. 28, 2005

(65) Prior Publication Data

US 2007/0121352 A1    May 31, 2007

(51) Int. Cl.
    *H02M 3/335*    (2006.01)
(52) U.S. Cl. .................. 363/21.15; 363/20; 363/20.01; 363/20.02; 363/21.12; 363/21.13; 363/21.14; 363/20.03; 363/20.04
(58) Field of Classification Search ............. 363/20.01, 363/20, 20.02, 21.12, 1.13, 21.14, 20.03, 363/20.04, 21.15, 21.152
    See application file for complete search history.

(56) References Cited

U.S. PATENT DOCUMENTS

| | | | | |
|---|---|---|---|---|
| 4,755,735 A | * | 7/1988 | Inakagata | 320/150 |
| 5,828,559 A | * | 10/1998 | Chen | 363/56.05 |
| 6,049,471 A | * | 4/2000 | Korcharz et al. | 363/20 |
| 6,134,123 A | * | 10/2000 | Yamada | 363/21.13 |
| 6,292,376 B1 | * | 9/2001 | Kato | 363/21.09 |
| 6,580,258 B2 | * | 6/2003 | Wilcox et al. | 323/282 |
| 6,594,161 B2 | * | 7/2003 | Jansen et al. | 363/21.14 |
| 6,674,655 B2 | * | 1/2004 | Giannopoulos et al. | 363/21.01 |
| 6,842,350 B2 | * | 1/2005 | Yamada et al. | 363/21.16 |
| 6,903,945 B2 | * | 6/2005 | Kitano | 363/21.01 |
| 2002/0186571 A1 | * | 12/2002 | Tsuge | 363/21.01 |
| 2005/0259448 A1 | * | 11/2005 | Koike | 363/21.01 |

* cited by examiner

*Primary Examiner*—Matthew V Nguyen
*Assistant Examiner*—Nguyen Tran
(74) *Attorney, Agent, or Firm*—Rosenberg, Klein & Lee

(57) ABSTRACT

The present invention provides a switching control circuit having a valley voltage detector to achieve the soft switching and improve the efficiency of a power converter. The switching control circuit includes a control circuit coupled to the feedback signal to generate a switching signal. Through an output circuit, the switching signal drives a switching device for switching a transformer and regulating the output of the power converter. The valley voltage detector is coupled to an auxiliary winding of the transformer for generating a control signal in response to the voltage of the transformer. The control signal is used for enabling the switching signal. The switching signal further turns on the switching device in response to a valley voltage across the switching device.

14 Claims, 5 Drawing Sheets

US 7,426,120 B2

SWITCHING CONTROL CIRCUIT HAVING A VALLEY VOLTAGE DETECTOR TO ACHIEVE SOFT SWITCHING FOR A RESONANT POWER CONVERTER

BACKGROUND OF THE INVENTION

1. Field of Invention

The present invention relates to a power converter, and more particularly, to a switching control circuit of the power converter.

2. Description of Related Art

Power converters are used to convert an unregulated power source to a regulated voltage or current source. The power converter normally includes a transformer or a magnetic device having primary winding and secondary winding to provide the isolation. A switching device connected in the primary winding to control energy transfer from the primary winding to the secondary winding. The power converter operates at a high frequency for allowing a size and weight reduction. However, the switching of the switching device generates the switching losses and electric-magnetic-interference (EMI). FIG. 1 shows a flyback power converter and the waveforms are shown in FIG. 2. The switching device 20 is applied to switch a transformer 10 and control the power delivered from the primary winding to the secondary winding of the transformer 10. Energy is stored into the transformer 10 when the switching device 20 is turned on. As the switching device 20 is switched off, the energy of the transformer 20 is discharged to the output of the power converter through a rectifier 30. In the mean time, a reflected voltage $V_R$ is generated in the primary winding of the transformer 10 in accordance with the output voltage $V_O$ and the turn-ratio of the transformer 10. Therefore, the voltage $V_D$ across to the switching device 20 is equal to the input voltage $V_{IN}$ plus the reflected voltage $V_R$ once the switching device 20 is turned off. The energy from the voltage $V_D$ is stored into the parasitic capacitor 25 of the switching device 20. After a discharge period $T_{DS}$, the energy of the transformer 10 is fully discharged, the energy stored in the parasitic capacitor 25 flows back to the input voltage $V_{IN}$ through the primary winding of the transformer 10. The parasitic capacitor 25 (capacitance Cj) and the primary winding inductor (inductance $L_P$) of the transformer 10 develop a resonant tank, wherein its resonant frequency $f_R$ can be shown as equation (1), $$f_R = \frac{1}{2\pi\sqrt{L_p \times C_j}} \quad (1)$$

During the resonant period, the energy of the parasitic capacitor 25 is delivered to the primary inductor of the transformer 10 back and forth. From the parasitic capacitor 25 discharged to a valley voltage occurred on the voltage $V_D$, there is a delay time Tq. The delay time Tq is the period of the quasi-resonant and it can be expressed as equation (2), $$T_q = \frac{1}{4 \times f_R} \quad (2)$$

If the switching device 20 can be turned on during the valley voltage across the switching device 20, which can achieve the soft switching to minimize the switching loss and EMI.

The object of the present invention is to develop a switching control circuit that is able to soft switch the transformer and improve the efficiency of the power converter.

SUMMARY OF THE INVENTION

A switching control circuit having a valley voltage detector achieves the soft switching and improves the efficiency for a power converter. The switching control circuit includes a control circuit coupled to the feedback signal to generate a switching signal. Through an output circuit, the switching signal drives a switching device for switching a transformer and regulating the output of the power converter. The valley voltage detector is coupled to an auxiliary winding of the transformer for generating a control signal in response to the voltage of the transformer. The control signal is applied to enable the switching signal. The switching signal further turns on the switching device in response to a valley voltage across the switching device. The valley voltage detector comprises an input terminal connected to the auxiliary winding of the transformer through a resistor. The minimum voltage of the input terminal is regulated as a constant value, which makes a current flowed through the resistor is proportional to an inverse voltage of the transformer. A current mirror is coupled the input terminal to generate a voltage signal on a first resistor in response to the current flowed through the resistor. A waveform detector coupled to the input terminal produces a beginning signal in accordance with the transformer voltage. A phase lock circuit is coupled to the first resistor to generate the control signal in response to the peak value of the voltage signal and the beginning signal. Therefore, the control signal will enable the switching signal to soft switch the switching device.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a flyback power converter;

DESCRIPTION OF THE PREFERRED EMBODIMENT

Figure 1:
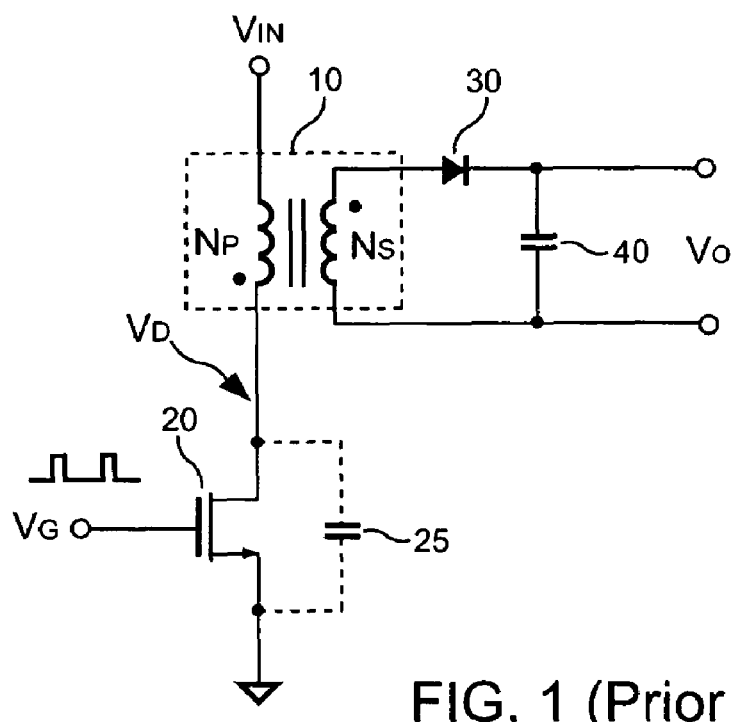
Figure 2:
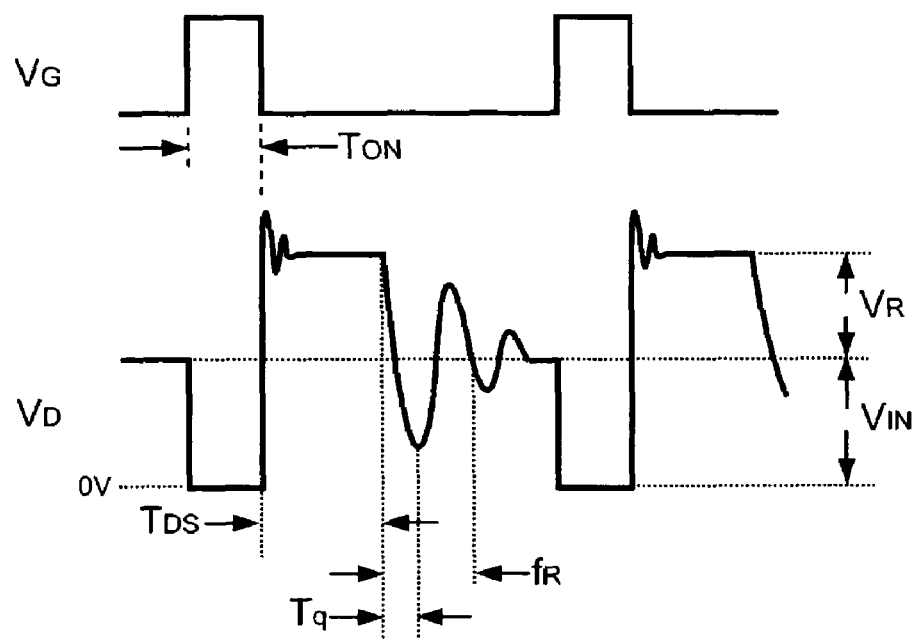
FIG. 2 shows the waveforms of the power converter in FIG. 1.
Figure 3:
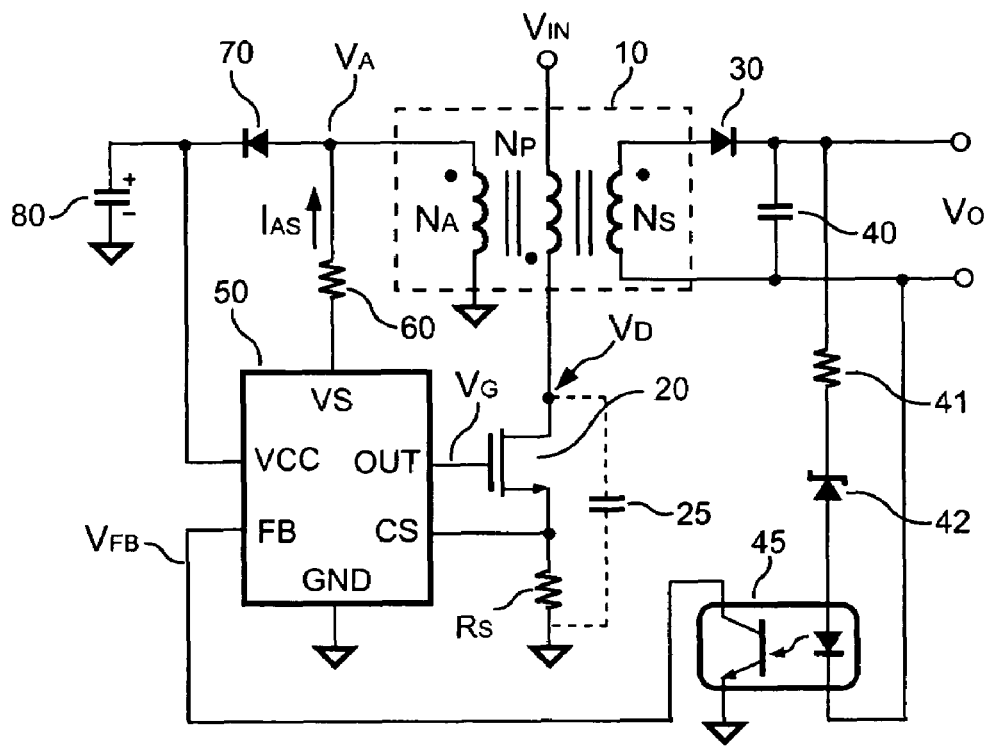
FIG. 3 is a preferred embodiment of a resonant power converter in accordance with the present invention.

FIG. 3 is a preferred embodiment of a power converter, in which a switching control circuit 50 includes a feedback terminal FB, a current sense terminal CS, an input terminal VS and an output terminal. The output terminal generates an output signal $V_G$ to drive the switching device 20. The switching device 20 is further coupled to switch the transformer 10 (or a magnetic device) and generate a switching current signal on a current-sense resistor 25. The transformer 10 comprises a primary winding $N_P$, a secondary winding $N_S$ and an auxiliary wind $N_A$. The primary winding $N_P$ is connected to the switching device 20. The secondary winding $N_S$ is coupled to the output of the power converter through the rectifier 30 and the output capacitor 40. The auxiliary wind $N_A$ provides the power source for the switching control circuit 50 through another rectifier 70 and a capacitor 80. A resistor 60 is further connected from the auxiliary winding $N_A$ to the input terminal VS. An optical coupler 45 is equipped to generate the feedback signal $V_{FB}$. The input of the optical coupler 45 is coupled to the output of the power converter $V_O$ through a resistor 41 and voltage regulator 42. The feedback terminal FB is coupled to the feedback signal $V_{FB}$ to generate a switching signal $S_W$ and the output signal $V_G$ for regulating the output of the power converter $V_O$.

Figure 4:
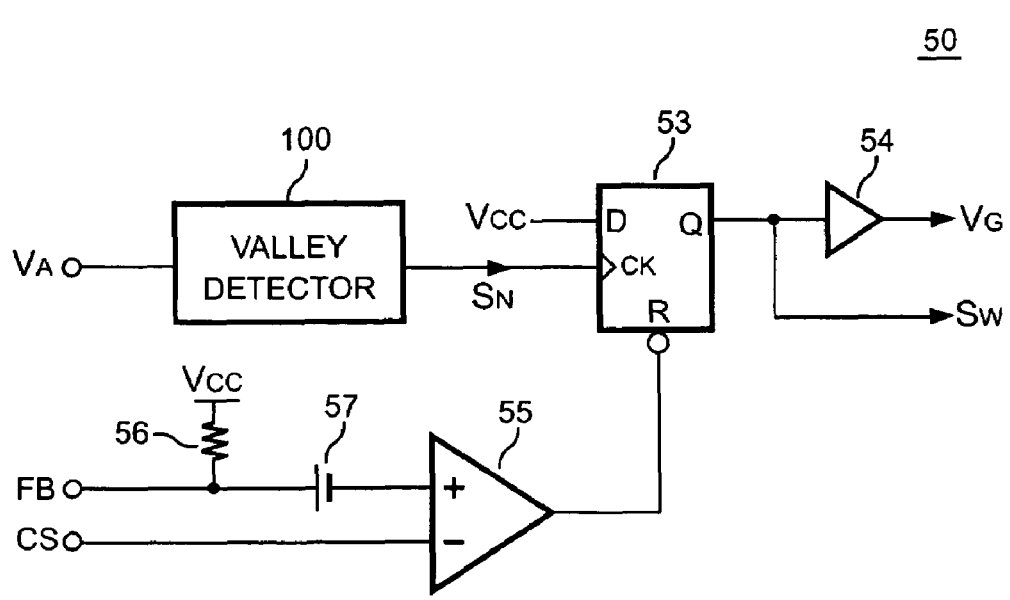
FIG. 4 is a block schematic of a switching control circuit in accordance with the present invention.

FIG. 4 is a schematic of the switching control circuit 50 in accordance with the present invention. A control circuit includes a flip-flop 53, a comparator 55, a resistor 56 and an offset voltage 57. The resistor 56 is connected to the feedback terminal FB to pull high the feedback signal $V_{FB}$. The positive input of the comparator 55 is coupled to receive the feedback signal $V_{FB}$ through the offset voltage 57. The offset voltage 57 provides a level-shift for the feedback signal $V_{FB}$. The negative input of the comparator 55 is coupled to the current sense terminal CS to receive the switching current signal and achieve the PWM (pulse width modulation) control. The output of the comparator 55 is coupled to reset the flip-flop 53. The output of the flip-flop 53 generates the switching signal $S_W$. A valley voltage detector 100 is coupled to the auxiliary winding $N_A$ of the transformer 10 for generating a control signal $S_N$. The control signal $S_N$ is transferred to the flip-flop 53 to turn on the switching signal $S_W$ in response to the voltage of the auxiliary winding $N_A$ of the transformer 10. The voltage of the auxiliary winding $N_A$ is proportional to the voltage across to the switching device 20. Therefore, through a phase lock operation, the control signal $S_N$ can be generated right before the valley voltage across the switching device 20. An output circuit 54 connected to the switching signal $S_W$ generates the output signal $V_G$. The output signal $V_G$ is further used to drive the switching device 20 for switching the transformer 10. Therefore, the switching device 20 can be turned on in response to the valley voltage across the switching device 20.

Figure 5:
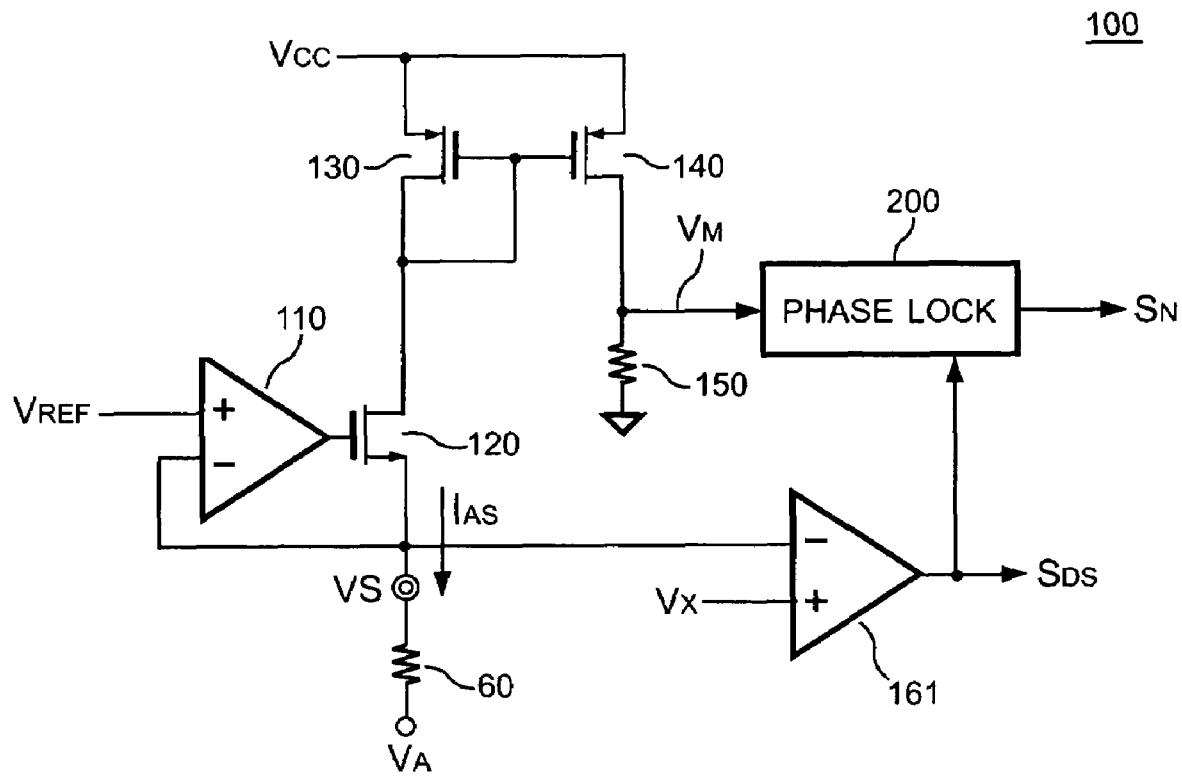
FIG. 5 is a block schematic of a valley voltage detector in accordance with the present invention.
Figure 6:
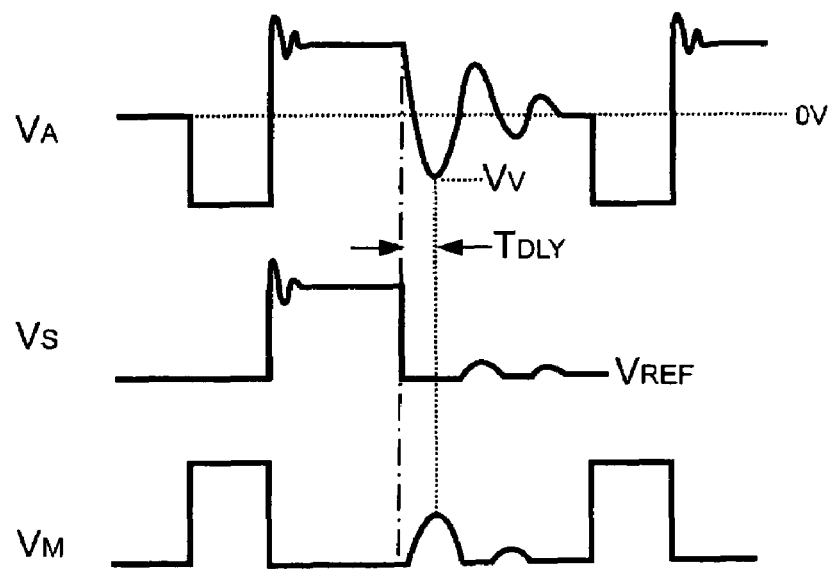
FIG. 6 shows the waveforms of the valley voltage detector in FIG. 5.

FIG. 5 shows a preferred schematic of the valley voltage detector 100 in accordance with the present invention, in which the input terminal VS is coupled to the auxiliary winding $N_A$ of the transformer 10 through the resistor 60. An operational amplifier 110 has a positive input connected to a reference voltage $V_{REF}$. The negative input of the operational amplifier is coupled to the input terminal VS. The output of the operational amplifier drives the gate of a transistor 120. The source of the transistor 120 is connected to the input terminal VS. Therefore, the minimum voltage of the input terminal VS is regulated as the reference voltage $V_{REF}$. A current mirror circuit is formed with the transistors 130, 140. In which, the transistor 130 is coupled to the input terminal VS through the transistor 120 and the transistor 140 outputs a current $I_{140}$ to generate a voltage signal $V_M$ at a resistor 150. FIG. 6 shows the waveform of the valley voltage detector 100. The current $I_{140}$ is generated in response to a current $I_{AS}$ flowed through the resistor 60. The current $I_{140}$ can thus be expressed as equation (3), $$I_{140} = I_{130} = \frac{V_{REF} - V_A}{R_{60}} \quad (3)$$

where $I_{130}$ is the current of the transistor 130; $R_{60}$ is the resistance of the resistor 60. $V_A$ is the voltage on the auxiliary winding $N_A$ of the transformer 10.

Figure 7A:
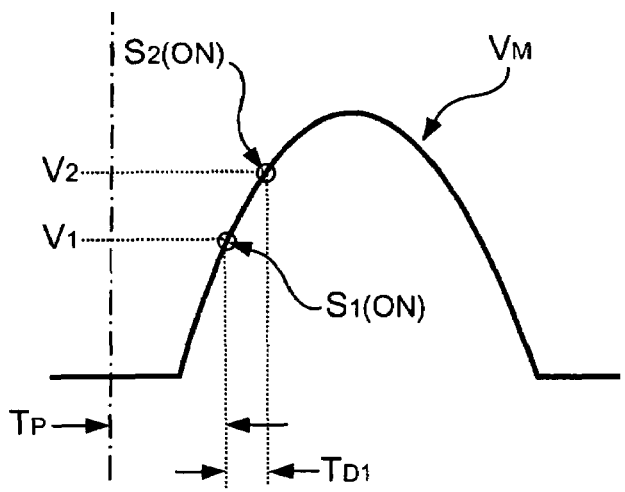
FIGS. 7A-7C shows the waveform for detecting the valley voltage and phase lock.
Figure 7B:
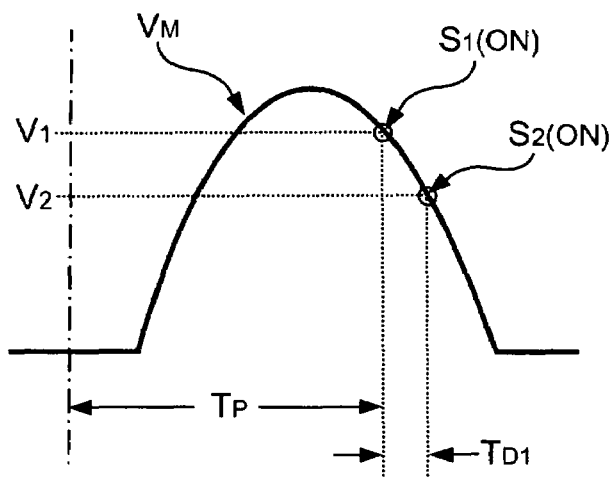
Figure 7C:
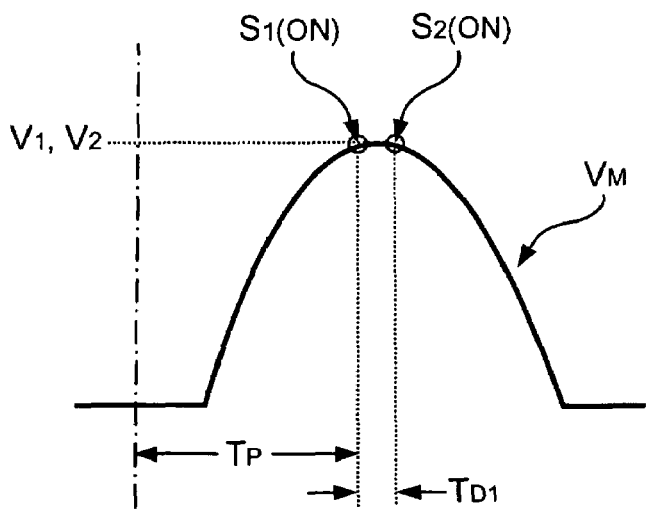

A waveform detector formed with a comparator 161 is coupled to the input terminal VS to produce a beginning signal $S_{DS}$ in accordance with the voltage $V_A$. The beginning signal $S_{DS}$ is enabled once the voltage $V_A$ is lower than a threshold voltage $V_X$. A phase lock circuit 200 is coupled to the resistor 150 to generate the control signal $S_N$ in response to the peak value of the voltage signal $V_M$ and the beginning signal $S_{DS}$. The phase lock operation and the waveforms are shown in FIGS. 7A-7C. A first sample-signal $S_1$ and a second sample-signal $S_2$ sample a voltage $V_1$ and a voltage $V_2$ from the voltage signal $V_M$ respectively. The beginning signal $S_{DS}$ is utilized to initiate the first sample-signal $S_1$ after a programmable delay time $T_P$. A time delay $T_{D1}$ is incorporated in between the first sample-signal $S_1$ and the second sample-signal $S_2$. The programmable delay time $T_{P1}$ increases as the voltage $V_2$ is higher than the voltage $V_1$. The programmable delay time $T_{P1}$ decreases once the voltage $V_2$ is not higher than the voltage $V_1$. The first sample-signal $S_1$ is utilized to determine the enable of the switching signal $S_W$. The second sample-signal $S_2$ is correlated to the output signal $V_G$. Therefore, the switching device 20 can be turned on in response to the valley voltage.

Figure 8:
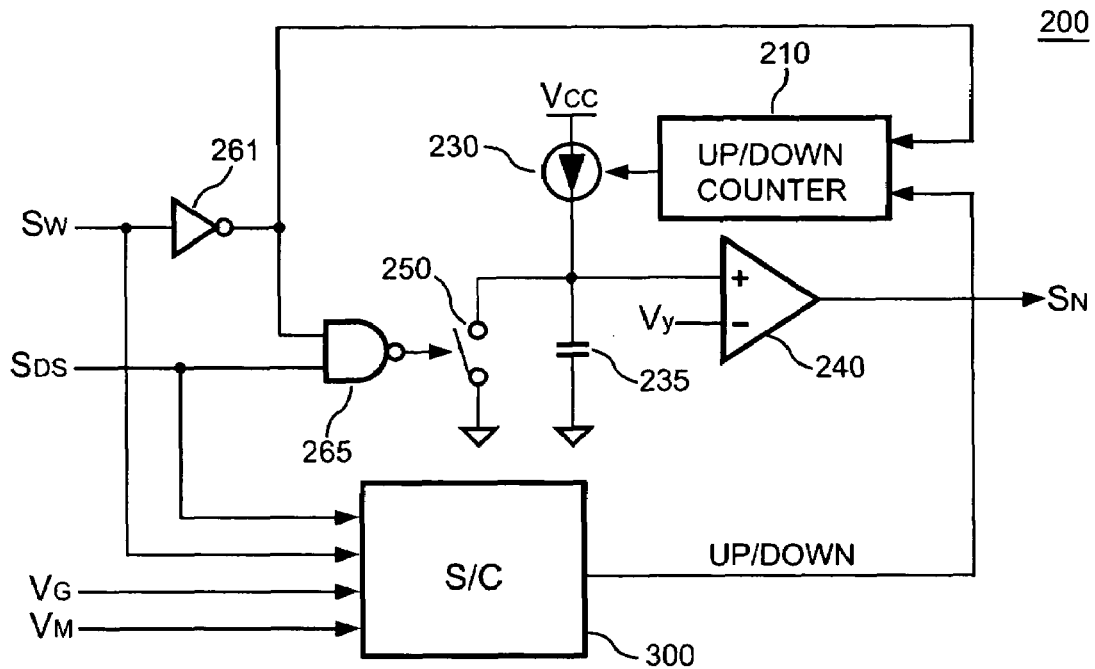
FIG. 8 is the circuit schematic of a phase lock circuit in accordance with the present invention.

The phase lock circuit 200 is shown in FIG. 8 in accordance with the present invention. It comprises a sample-compare circuit 300 for generating an up/down signal in response to the beginning signal $S_{DS}$, the switching signal $S_W$, the voltage signal $V_M$ and the output signal $V_G$ of the output circuit 54. An up/down counter 210 generates a counter-output in response to the clocking of the switching signal $S_W$ and the up/down signal. A delay circuit includes a charge current 230, a capacitor 235 and a delay-control circuit to generate the control signal $S_N$. The delay-control circuit comprises a comparator 240, a switch 250, an inverter 261 and an NAND gate 265. The first input of the NAND gate 265 is connected to the beginning signal $S_{DS}$. The second input of the NAND gate 265 is coupled to the switching signal $S_W$ via the inverter 261. The output of the NAND is coupled to control the on/off of the switch 250. The switch 250 is applied to discharge the capacitor 235. The positive input of the comparator 240 is connected to the capacitor 235. A threshold voltage $V_Y$ supplies the negative input of the comparator 240. The comparator 240 outputs the control signal $S_N$ once the switch 250 is turned off and the voltage of the capacitor 235 is charged higher than the threshold voltage $V_Y$. The charge current 230 and the capacitor 235 determine the programmable delay time $T_P$ that is incorporated in between the beginning signal $S_{DS}$ and the control signal $S_N$. The charge current 230 is generated in accordance with the counter-output of the up/down counter 210. The control signal $S_N$ is thus produced in response to the peak value of the voltage signal $V_M$.

Figure 9:
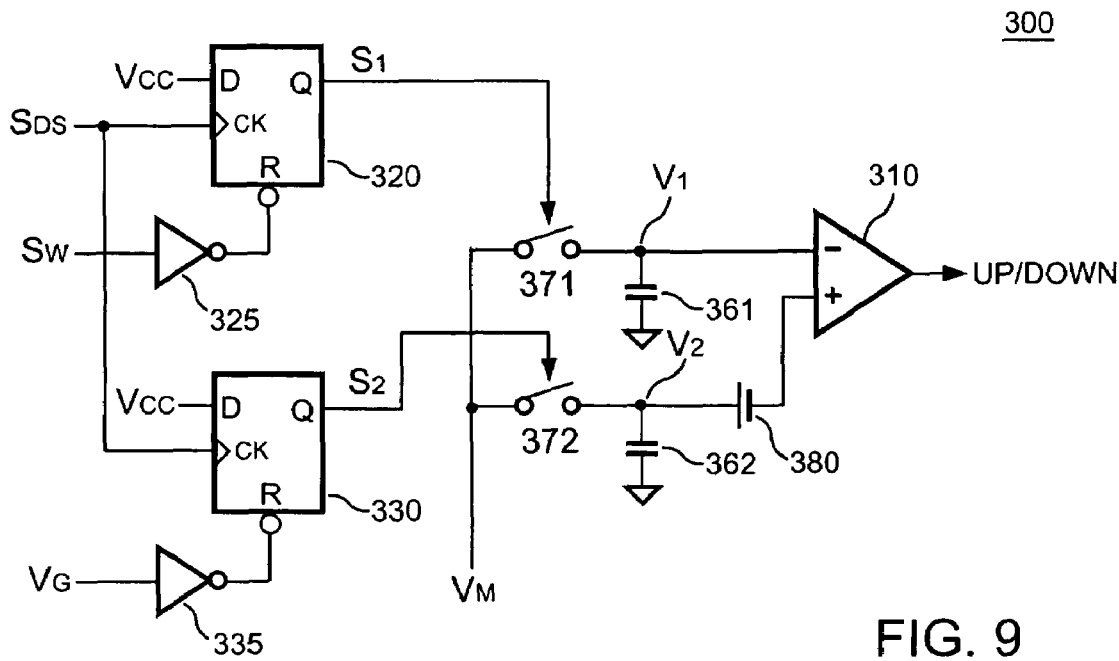
FIG. 9 is the circuit schematic of a sample-compare circuit in accordance with the present invention.

FIG. 9 is the circuit schematic of the sample-compare circuit 300 that comprises a sample signal generator for producing a first sample signal $S_1$ and a second sample signal $S_2$. Flip-flops 320, 330 and inverters 325, 335 form the sample signal generator. The beginning signal $S_{DS}$ is connected to the clock inputs of the flip-flops 320 and 330. The reset input of the flip-flop 320 is connected to switching signal $S_W$ through the inverter 325. The reset input of the flip-flop 330 is connected to the output signal $V_G$ through the inverter 335. Therefore, the first sample signal $S_1$ and the second sample signal $S_2$ are enabled in response to the beginning signal $S_{DS}$. The first sample signal $S_1$ is disabled once the switching signal $S_W$ is enabled. The second sample signal $S_2$ is disabled in response to the output signal $V_G$ of the output circuit 54 is switched on. Therefore, the time delay $T_{D1}$ incorporated in between the first sample-signal $S_1$ and the second sample-signal $S_2$ is determined by the propagation delay of the output circuit 54. A first capacitor 361 and a second capacitor 362 are used for generating the voltage $V_1$ and a voltage $V_2$. A first sample switch 371 is connected from the voltage signal $V_M$ to the first capacitor 361. The first sample switch 371 is controlled by the first sample signal $S_1$.

A second sample switch 372 is connected from the voltage signal $V_M$ to the second capacitor 362. The second sample switch 372 is controlled by the second sample signal $S_2$. A comparator 310 having a negative input is connected to the first capacitor 361. The positive input of the comparator 310 is connected to the second capacitor 362 through an offset voltage 380. The comparator 310 therefore generates the up/down signal in accordance with the voltage $V_1$ and the voltage $V_2$. After that, the up/down signal is coupled to the up/down counter 210 to enable the up count once the switching signal $S_W$ is turned on before the valley voltage across the switching device 20. The up/down signal enables the down count if the switching signal $S_W$ is turned on after the valley voltage across the switching device 20. The phase lock operation, as foregoing description, achieves the soft switching for the switching device 20 and improve the efficiency for the power converter.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A switching control circuit having a valley voltage detector for a power converter, comprising:
   a control circuit coupled to a feedback signal of the power converter to generate a switching signal for controlling a switching device responsive to a valley voltage generated across the same for regulating an output of the power converter;
   an output circuit receiving the switching signal and generating an output signal responsive thereto to turn said switching device ON, said switching device switching a transformer of the power converter;
   an input terminal coupled to an auxiliary winding of the transformer through a resistor, in which a minimum voltage on the input terminal is regulated;
   a first resistor;
   a current mirror coupled to the input terminal for generating a voltage signal at the first resistor in response to a current flowed through the resistor while said switching device is OFF;
   the valley voltage detector including: a waveform detector, coupled to the auxiliary winding through said input terminal to detect a variation of a voltage of said auxiliary winding and to produce a beginning signal in response to a valley voltage generated across said switching device and detected by said waveform detector while said switching device is OFF; and
   a phase lock circuit coupled to the first resistor to generate a control signal to enable the switching signal in response to the peak value of the voltage signal and the beginning signal;
   wherein the switching device is switched on in response to the valley voltage across the switching device.

2. The switching control circuit having a valley voltage detector as claimed in claim 1, the phase lock circuit comprising:
   a sample-compare circuit generating a counter control signal in response to the beginning signal, the switching signal, the voltage signal and the output signal of the output circuit;
   a counter generating a counter-output in response to the clocking of the switching signal and the counter control signal; and
   a delay circuit including a charge current, a capacitor and a delay-control circuit to generate the control signal;
   wherein the charge current and the capacitor determine a delay time between the beginning signal and the control signal; the charge current is generated in accordance with the counter-output; in which the control signal is produced in response to the peak value of the voltage signal.

3. The switching control circuit having a valley voltage detector as claimed in claim 2, the sample-compare circuit comprising:
   a sample signal generator, producing a first sample signal and a second sample signal, wherein the first sample signal and the second sample signal are enabled in response to the beginning signal; the first sample signal is disabled once the switching signal is enabled; the second sample signal is disabled in response to the output signal of the output circuit is switched on;
   a first capacitor and a second capacitor, generating a first voltage and a second voltage;
   a first sample switch, connected from the voltage signal to the first capacitor, in which the first sample switch is controlled by the first sample signal;
   a second sample switch, connected from the voltage signal to the second capacitor, in which the second sample switch is controlled by the second sample signal;
   an offset voltage; and
   a comparator, having a negative input connected to the first capacitor, wherein a positive input of the comparator is connected to the second capacitor through the offset voltage;
   wherein the comparator generates the counter control signal in accordance with the first voltage and the second voltage.

4. The switching control circuit having a valley voltage detector as claimed in claim 2, wherein the counter control signal is coupled to the counter to enable the up count once the switching signal is turned on before the valley voltage across the switching device, and the counter control signal enables the down count once the switching signal is turned on after the valley voltage across the switching device.

5. A switching control circuit having a valley voltage detector for a power converter, comprising:
   a control circuit, coupled to the feedback signal of the power converter to generate a switching signal for controlling a switching device responsive to a valley voltage generated across the same for regulating an output of the power converter;
   an output circuit, receiving the switching signal and generating an output signal responsive thereto to turn said switching device ON. said switching device switching a transformer of the power converter; and a valley voltage detector, coupled to an auxiliary winding of the transformer for generating a control signal to enable the switching signal in response to the valley voltage generated across said switching device and detected by said valley voltage detector while said switching device is OFF;

wherein the switching device is turned on in response to a said valley voltage detected across the switching device while the same is OFF.

6. The switching control circuit having a valley voltage detector as claimed in claim 5, the valley voltage detector comprising:

an input terminal; coupled to the auxiliary winding of the transformer through a resistor, in which a minimum voltage of the input terminal is regulated;

a first resistor;

a current mirror; coupled the input terminal to generate a voltage signal at the first resistor in response to a current flowed through the resistor while said switching device is OFF;

a waveform detector; coupled to the input terminal to produce a beginning signal in accordance with the valley voltage across said switching device while the same is OFF; and a phase lock circuit; coupled to the first resistor to generate the control signal in response to the peak value of the voltage signal and the beginning signal.

7. The switching control circuit having a valley voltage detector as claimed in claim 6, the phase lock circuit comprising:

a sample-compare circuit, generating a counter control signal in response to the beginning signal, the switching signal, the voltage signal and the output signal of the output circuit;

a counter, generating a counter-output in response to the clocking of the switching signal and the counter control signal; and a delay circuit, including a charge current, a capacitor and a delay-control circuit to generate the control signal;

wherein the charge current and the capacitor determine a delay time between the beginning signal and the control signal; the charge current is generated in accordance with the counter-output; in which the control signal is produced in response to the peak value of the voltage signal.

8. The switching control circuit having a valley voltage detector as claimed in claim 7, the sample-compare circuit comprising:

a sample signal generator producing a first sample signal and a second sample signal, wherein the first sample signal and the second sample signal are enabled in response to the beginning signal; the first sample signal is disabled once the switching signal is enabled; the second sample signal is disabled in response to the output signal of the output circuit is switched on;

a first capacitor and a second capacitor for generating a first voltage and a second voltage;

a first sample switch connected from the voltage signal to the first capacitor, in which the first sample switch is controlled by the first sample signal;

a second sample switch connected from the voltage signal to the second capacitor, in which the second sample switch is controlled by the second sample signal;

an offset voltage; and a comparator, having a negative input connected to the first capacitor, and a positive input of the comparator is connected to the second capacitor through the offset voltage;

wherein the comparator generates the counter control signal in accordance with the first voltage and the second voltage.

9. The switching control circuit having a valley voltage detector as claimed in claim 7, wherein the counter control signal is coupled to the counter to enable the up count once the switching signal is turned on before the valley voltage across the switching device, and the counter control signal enables the down count once the switching signal is turned on after the valley voltage across the switching device.

10. A switching control circuit for soft switching of a power converter, comprising:

a control circuit; coupled to the feedback signal of the power converter to generate a switching signal for controlling a switching device responsive to a valley voltage generated across the same for regulating an output of the power converter;

an output circuit; generating an output signal in accordance with the switching signal, the output signal is a being coupled to said switching device for switching a magnetic device of the power converter;

an input circuit; coupled to an auxiliary winding of the magnetic device for generating a voltage signal in accordance with a valley voltage generated across said switching device; and a phase lock circuit; coupled to the voltage signal for generating a control signal to enable the switching signal in response to a the valley voltage across the switching device.

11. The switching control circuit for soft switching the power converter as claimed in claim 10, the input circuit comprising:

an input terminal coupled to the auxiliary winding of the magnetic device through a resistor, in which a minimum voltage of the input terminal is regulated;

a first resistor;

a current mirror coupled the input terminal to generate the voltage signal at the first resistor in response to a current flowed through the resistor while said switching device is OFF; and a waveform detector coupled to the input terminal to produce a beginning signal in accordance with the valley voltage across the switching device.

12. The switching control circuit for soft switching the power converter as claimed in claim 10, the phase lock circuit comprising:

a sample-compare circuit generating a counter control signal in response to the beginning signal, the switching signal, the voltage signal and the output signal of the output circuit;

a counter generating a counter-output in response to the clocking of the switching signal and the counter control signal; and a delay circuit including a charge current, a capacitor and a delay-control circuit to generate the control signal;

wherein the charge current and the capacitor determine a delay time between the beginning signal and the control signal, and the charge current is generated in accordance with the counter-output.

13. The switching control circuit for soft switching the power converter as claimed in claim 12, the sample-compare circuit comprising:

a sample signal generator, producing a first sample signal and a second sample signal, wherein the first sample signal and the second sample signal are enabled in response to the beginning signal; the first sample signal is disabled once the switching signal is enabled, and the second sample signal is disabled in response to the output signal of the output circuit is switched on;

a first capacitor and a second capacitor, generating a first voltage and a second voltage;

a first sample switch, connected from the voltage signal to the first capacitor, in which the first sample switch is controlled by the first sample signal;

a second sample switch, connected from the voltage signal to the second capacitor, in which the second sample switch is controlled by the second sample signal;

an offset voltage; and a comparator, having a negative input connected to the first capacitor, and a positive input of the comparator is connected to the second capacitor through the offset voltage;

wherein the comparator generates the counter control signal in accordance with the first voltage and the second voltage.

14. The switching control circuit for soft switching the power converter as claimed in claim 12, wherein the counter control signal is coupled to the counter to enable the up count once the switching signal is turned on before the valley voltage across the switching device, and the counter control signal enables the down count once the switching signal is turned on after the valley voltage across the switching device.

* * * * *